(12) United States Patent
Casado Montero (10) Patent No.: US 8,042,349 B2
(45) Date of Patent: Oct. 25, 2011

(54) DEVICE TO CONTROL THE VENTILATION AND AIR CONDITIONING OF AIRCRAFT ON THE GROUND

(75) Inventor: Carlos Casado Montero, Madrid (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 898 days.

(21) Appl. No.: 12/073,772

(22) Filed: Mar. 10, 2008

(65) Prior Publication Data

US 2009/0084122 A1    Apr. 2, 2009

(30) Foreign Application Priority Data

Oct. 1, 2007   (ES) .................................. 200702560

(51) Int. Cl.
*B60H 1/32* (2006.01)
(52) U.S. Cl. ........................................................ 62/244
(58) Field of Classification Search .................... 62/244, 62/172; 236/49.3, 49.4
See application file for complete search history.

(56) References Cited

U.S. PATENT DOCUMENTS

| | | | |
|---|---|---|---|
| 3,711,044 | A | 1/1973 | Matulich |
| 4,698,977 | A | 10/1987 | Takahashi |
| 4,969,508 | A | 11/1990 | Tate et al. |
| 5,967,461 | A | 10/1999 | Farrington |
| 6,543,715 | B1 * | 4/2003 | Karpov et al. ............... 244/2 |
| 6,622,926 | B1 | 9/2003 | Sartain et al. |
| 2002/0157414 | A1 | 10/2002 | Iwanami et al. |
| 2007/0084938 | A1 | 4/2007 | Liu |

FOREIGN PATENT DOCUMENTS

FR        2 829 466        3/2003

* cited by examiner

*Primary Examiner* — Melvin Jones
(74) *Attorney, Agent, or Firm* — Wenderoth, Lind & Ponack, L.L.P.

(57) ABSTRACT

New ecological operating mode that limits ventilation and air conditioning in the cabin (3) of the aircraft when the ecological operating mode has been selected, the aircraft is stationed on the ground, the engines are off, the engines' start up system has not been activated, the pneumatic or electrical energy supply system that typically controls ventilation and air conditioning in the aircraft has been activated and is supplying air, to provide a new method of operating at an established minimum limit independent of the difference between the selected temperature and the temperature measured, saving energy, and reducing pollutant emissions and noise.

14 Claims, 6 Drawing Sheets

DEVICE TO CONTROL THE VENTILATION AND AIR CONDITIONING OF AIRCRAFT ON THE GROUND

OBJECT OF THE INVENTION

The invention refers to a device that was designed to control the ventilation and air conditioning requirements of an aircraft stationed on the ground. The aim of the device is to operate ecologically at an optimal minimum level when the aircraft is on the ground in order to minimize energy consumption, pollutant emissions and noise levels.

BACKGROUND OF THE INVENTION

Current commercial aircraft typically have two or more propulsion elements, main engines, and an auxiliary power unit (APU). The APU provides electrical or pneumatic energy, or a combination of both, when the aircraft is on the ground. The main engines usually perform this function during other operations. The majority of APUs can also provide energy during flights, and are generally seen as a backup electrical and/or pneumatic energy generation system in the event that either of the energy systems fails.

When the plane is stationed on the ground, the APU supplies electrical and pneumatic energy for the following operations: refueling, passenger boarding and debarking, restocking consumables and provisions for subsequent flights, loading and unloading, cleaning, aircraft maintenance tasks, etc., and to start up the main engines, either electrically or pneumatically.

When the main engines are turned off the APU supplies pneumatic power to the cabin's ventilation and air conditioning system; alternatively the support services on the ground provide energy for this operation. However some cabin ventilation and air conditioning systems can be powered electrically if electrical architecture is installed on the aircraft together with a pneumatic energy generation system independent of a power plant, engines and APU. This system simply requires electricity, which can be supplied by the APU or support services on the ground.

A pneumatic energy generation system can exist independently of an electrical system. The air conditioning system renews the air in the aircraft based on the difference between the selected temperature (for the entire plane or sections of the plane) and the actual temperature inside the cabin. Demand is lower the closer the two temperatures. When they are equal they are said to have reached a steady state condition. The steady state condition corresponds to a constant demand signal as long as all the aforementioned parameters remain steady. It will require an increasingly strong flow the greater the heat in the plane. For example, a pneumatic cabin air conditioning system powered by an APU pneumatic energy supplier typically operates when there is a demand signal of 0% to 100%. When there is a major gap between the selected and actual cabin temperature there is a high level of demand, that is, 100% or close to 100%. As the gap between the two temperatures diminishes the level of demand decreases until it reaches a point of equilibrium in terms of demand, either equivalent to or less than the initial value. The point of equilibrium will be higher the more heat that there has be released (hot days when the temperature in the cabin needs to fall), or the higher the demand for heat (cold days when the temperature in the cabin is required to rise).

The demand signal is sent between the pneumatic air conditioning system controllers and the APU controller.

The cabin temperature can be selected in the cockpit or at different control panels throughout the aircraft cabin and may be adjusted by the cabin crew or maintenance personnel.

When demand increases power increases, independent of whether the pneumatic generator is the APU or the electrically powered pneumatic compressors. Increased demand translates as an increase in the fuel consumption of the power generator. For example if the APU is generating pneumatic power and the demand signal increases by 10%, the level of power the APU has to provide increases by the same measure. This translates as an increase in fuel consumption and an increase in noise generated by the APU. If demand increases 10% the electricity the electrically powered pneumatic compressors consume increases by the same measure. If the APU generates electrical energy, fuel consumption increases, simultaneously increasing pollutant emissions and noise.

An aircraft's ventilation and air conditioning system is designed to provide maximum comfort, even when the aircraft is on the ground. In most cases, maximum comfort requirements fall when the aircraft is stationary.

The technical report indicates there is no device that can control ventilation and air conditioning in the cabin based on environmental variables such as outside ambient temperature, height, or a pre-established limit, to minimize fuel consumption, pollutant emissions or noise.

SUMMARY OF THE INVENTION

To achieve our objective and counteract the aforementioned negatives, the invention to control the aircraft's ventilation and air conditioning system when stationed on the ground, must be connected to the engine's start up system, the same way conventional devices are. The device should also have a temperature selection system inside the aircraft, as well as a system to measure temperature. Other systems required include: a pneumatic air conditioning system that connects to a pneumatic energy supply in order to supply air; and an electrically powered pneumatic compressor system connected to an electrical energy supply system and to the pneumatic air conditioning system to supply air to the latter via pneumatic compressors, which are the only elements powered electrically by the invention device; or both. All of the above are required to proportionately control the aircraft's ventilation and air conditioning, based on the difference between the selected temperature in the cabin and the temperature measured, as indicated in the technical report and described in the previous section.

The invention's innovation lies in the incorporation of an ecological mode of ventilation and air conditioning, as well as a system that detects whether the ecological mode has been selected, a system to detect the position of the aircraft on the ground, a system to detect whether the aircraft's engines are off, a system to detect whether the selected energy supply system has been activated—this may be either the pneumatic energy supply or electrical energy supply, a system to detect whether air is being supplied, and a system to detect whether the engine's start up system is activated. The device also incorporates a system that generates a signal when the device is in ecological mode, which corresponds to an optimal minimum value of ventilation and air conditioning. This value is applied selectively to the pneumatic energy supply system, the electrically powered pneumatic compressors and the electrical energy supply system, when the ecological mode is selected, has detected that the aircraft is on the ground, the engines are off or the engine's start-up systems have not been activated. The aforementioned system also detects whether the selected system the pneumatic energy supply system or the electrical energy supply system, has been activated and air is being supplied. In turn it controls ventilation and air conditioning in accordance with the minimum optimal values established by the ecological operating mode signal, independent of the difference between the selected and measured temperature.

The major advantage of this configuration is that when the aircraft is stationed on the ground and the ecological operating mode is selected, a new operating mode is generated. This mode was described in a general way in the previous section. It offers a limited mode of cabin ventilation and air conditioning. By establishing a demand signal based on environmental parameters such as outside ambient temperature, pressure (barometric height), or a specific pre-established limit, an optimal minimum value for each of the aforementioned parameters is established. These values are not affected by other types of variables. Reduced demand leads to reduced energy consumption, specifically APU fuel consumption. As the direct pneumatic power generator, or the electrical power generator for pneumatic compressors, the APU's energy consumption falls to the minimum optimal level, thus minimizing the level of pollutants released into the airport's surroundings and minimizing noise levels. By fixing the demand signal at an optimal minimum value the level of noise generated by the APU is reduced, as in the case of the air conditioning pneumatic system and related systems.

For the invention to work, at least one of the parameter's operations must coincide with the signal for the ecological operating mode, e.g. the external temperature of the aircraft, external pressure, or both.

The ecological operating mode signal also has to correspond to a pre-established value for the invention to work.

Either the aircraft's APU or the electrically powered pneumatic compressor system shall constitute the aircraft's pneumatic energy supply system. Both are typically found on aircraft.

The aircraft's APU or an external electrical energy supply unit may supply the invention's electrical energy needs.

The following systems may be included in the pneumatic air conditioning system, the pneumatic energy supply system, the electrically powered pneumatic compressor system or the electrical energy supply system; or any combination of these: an ecological mode selection system for ventilation and air conditioning, a system that detects whether or not the ecological mode has been selected, a system to detect the position of the aircraft on the ground, a system to detect whether the aircraft's engines are off, a system to detect whether the selected energy supply system has been activated—this may be either a pneumatic energy supply or electrical energy supply, a system to detect whether air is being supplied, a system to detect whether the engine's start up system is activated, and a system that generates an ecological operating mode signal.

The ecological operating mode selection system consists of a selector that either connects to the system that generates the ecological mode operating signal by means of cables or an Ethernet, or a combination of both. For the invention to work, the ecological operating mode selection system must be incorporated in the system that generates the ecological operating mode signal.

As regards controlling the invention's normal operations, the inside temperature of the aircraft may refer to the overall temperature or the temperature of a section of the plane.

To help users understand the descriptive report a series of drawings is attached by way of example of the invention's uses. The drawings form part of this report.

BRIEF DESCRIPTION OF THE DRAWINGS

FIGS. 3-5 show different applications of the invention in line with the conventional system shown in FIG. 1 in which the APU is the pneumatic generator that supplies air to the pneumatic air conditioning system.

in FIG. 5 it connects to a different controller.

FIGS. 6-8 show a possible application of the invention in line with the conventional system shown in FIG. 2, in which the APU constitutes an electrical generator that supplies energy to the electrically powered pneumatic compressor system.

DETAILED DESCRIPTION OF THE INVENTION

A description of the invention based on the aforementioned drawings follows.

Figure 1:
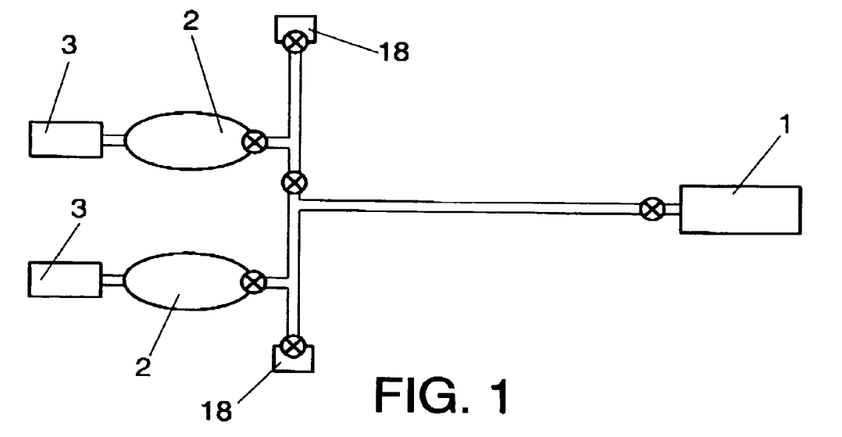
FIG. 1 is a typical schematic diagram of a ventilation and air conditioning system on an aircraft, in which a pneumatic air conditioning system is powered pneumatically by an APU.

Firstly and with the help of FIG. 1, we will describe, in a generic way, the configuration of a possible implementation of conventional ventilation and air conditioning systems in an aircraft. An auxiliary power unit (APU) 1 is required to constitute a pneumatic power supply system. It connects to a pneumatic air conditioning system 2 providing ventilation and air conditioning in the cabin 3 of the aircraft (cabin refers to the pressurized area of the aircraft). To keep ventilation and air conditioning at the correct level, the pneumatic air conditioning system 2 receives air from the APU 1, which supplies the air needed to maintain the correct temperature inside the cabin 3, based on the difference between selected temperature and measured temperature.

Conventional ventilation and air conditioning systems also connect to the aircraft engines 18, to provide pneumatic energy when operating. In this case the engines should be off or interrupted.

Figure 2:
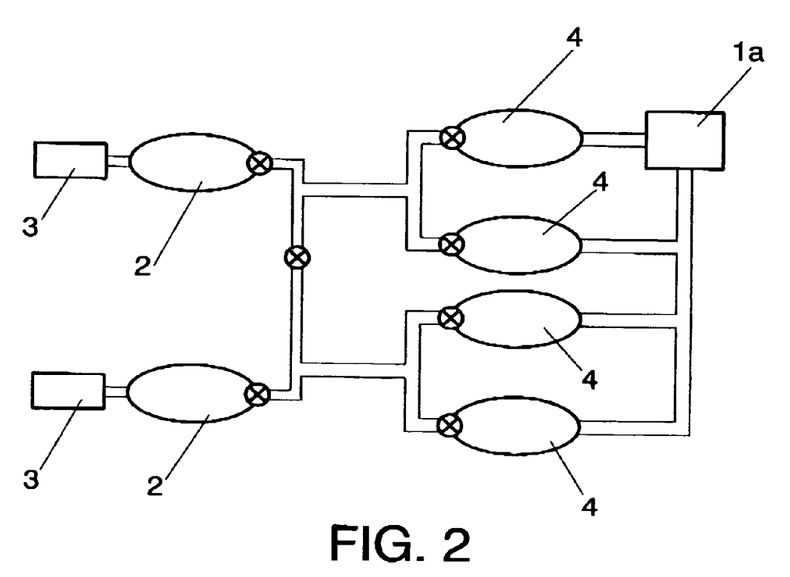
FIG. 2 shows a typical schematic diagram similar to FIG. 1. It shows a pneumatic air conditioning system that is electrically powered by an APU's pneumatic compressors.

FIG. 2 shows another possible implementation in which a pneumatic air conditioning system 2 is connected to an electrically powered pneumatic compressor system 4. The air the system 2 requires to keep the temperature of the cabin 3 at the correct level is provided by a system 4 that is electrically powered by an electrical energy supply APU 1*a*.

As indicated in the section entitled Background the disadvantage of these systems is that when the demand for ventilation and air conditioning increases, that is, the difference between selected temperature and measured temperature increases, power increases, which translates as an increase in the power generator's fuel consumption. In other words, when the demand signal increases by a specific percentage, the power generated by the APU 1 increases by the same measure, which translates as an increase in the APU's 1 fuel consumption and noise levels. As regards the pneumatic compressor system 4, if demand increases by a specific percentage, electrical power increases by the same amount, which leads to an increase in the APU's fuel consumption, and resulting pollutant emissions and noise. For this example APU (1*a*) was selected as the sole source of electrical supply.

To counteract this negative phenomenon the invention has developed a device to provide an ecological operating mode of ventilation and air conditioning when the plane is stationed on the ground. The invention requires an ecological operating mode selection system 5 for ventilation and air conditioning, comprising a selector controller 5, as indicated in the figures. Controller 5 can be any type of controller, for example a rotary selector, a screen menu, etc.

Figure 3:
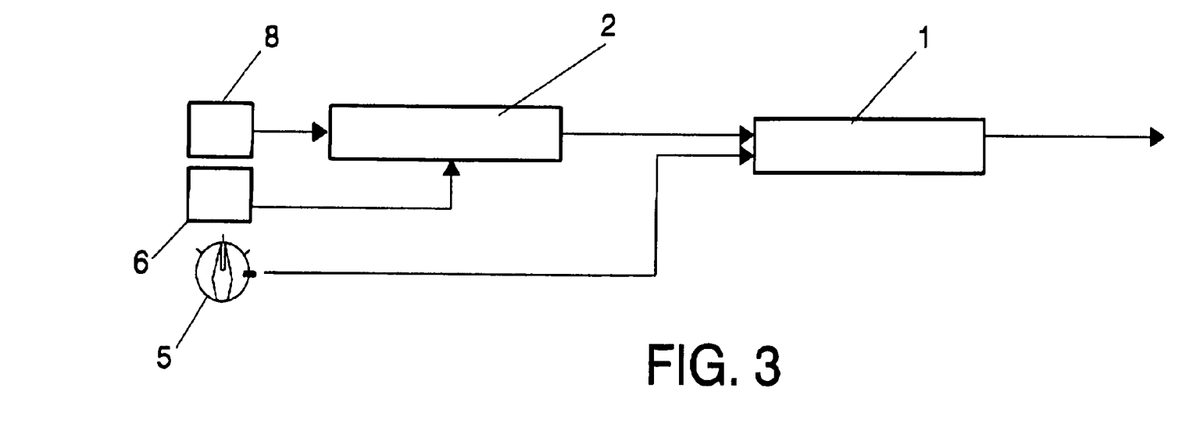
FIG. 3 shows how the ecological operating mode selection system for ventilation and air conditioning connects to the APU.
Figure 4:
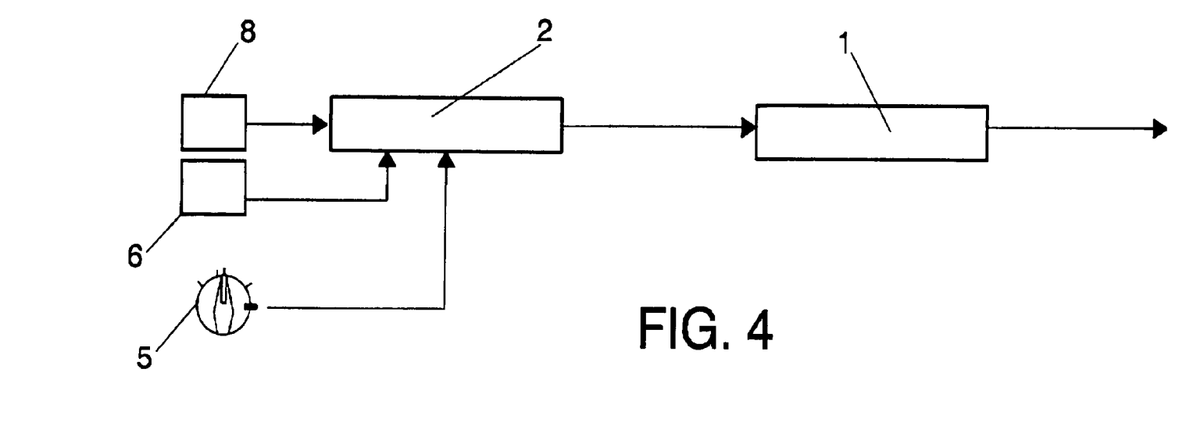
in FIG. 4 the ecological operating mode selection system for ventilation and air conditioning connects to the pneumatic air conditioning system.
Figure 5:
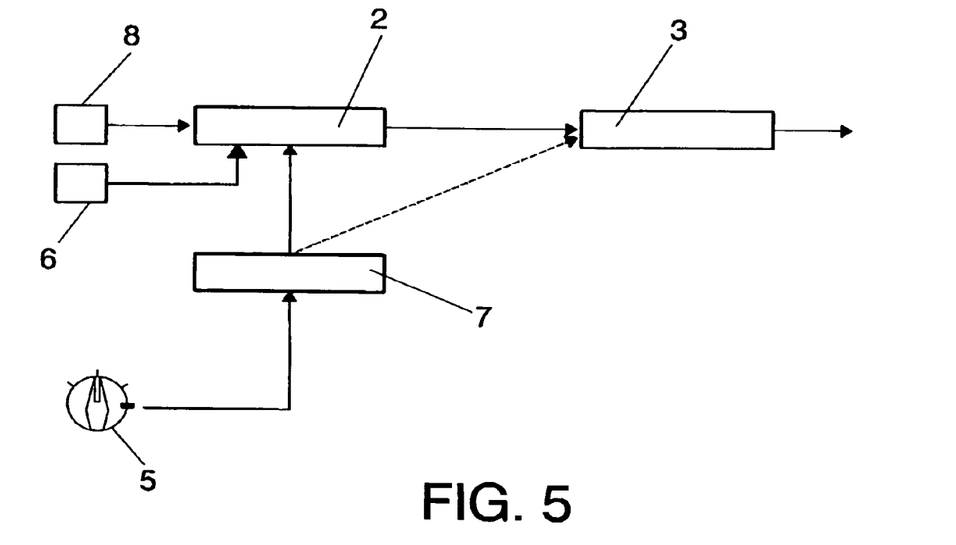

FIGS. 3-5 show different application examples relating to FIG. 1, where APU 1 is required to supply air to the system 2.

FIG. 3. When the ecological operating mode for ventilation and air conditioning is selected by controller 5, the APU 1 controller selects the ecological operating mode to limit cabin ventilation and air conditioning, based on environmental parameters such as outside ambient temperature, pressure (barometric height), or a pre-established limit, establishing an optimal minimum for each variable that is not affected by other variables. Lower demand leads to a decrease in APU fuel consumption, as described further on, indicating that the invention device may be incorporated in the actual APU 1.

Numerical reference 6 refers to the temperature selector, which is typically found inside the cabin 3, and connects to the pneumatic air conditioning system 2. Reference 8 refers to the sensors that measure cabin temperature 3.

Consequently APU 1 detects the direct selection of the ecological operating mode.

FIG. 4 shows another implementation of the device. Here selector 5 connects to the pneumatic air conditioning system 2 in such a way that it detects the selection of the ecological operating mode and informs the APU 1, which in turn controls the ecological operating mode.

FIG. 5 shows another implementation. Selector 5 is connected to controller 7.

The ecological operating mode selection is detected and system 2 is informed. System 2 in turn informs APU 1. Alternatively controller 7 informs APU 1 directly; shown by the dotted line.

The aforementioned situation also applies to the conventional system presented in FIG. 2, but in this case an APU 1 is used to supply electrical energy to the pneumatic compressors 4.

Figure 6:
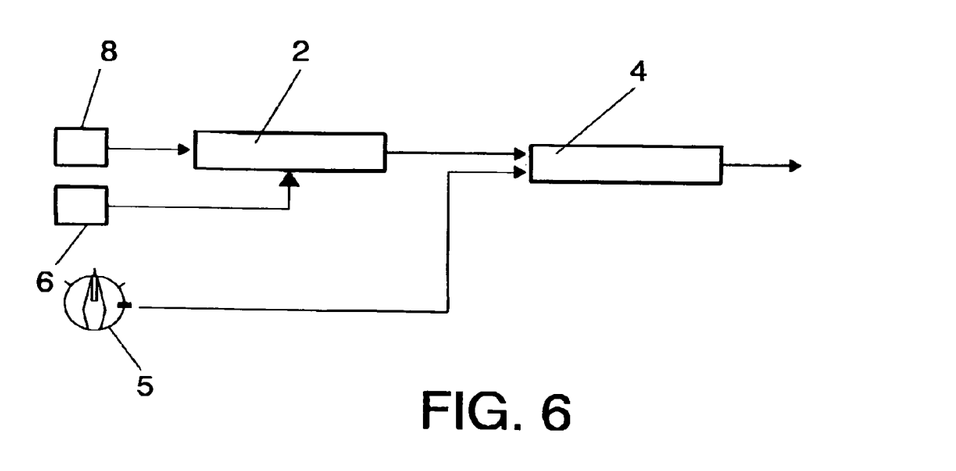
FIG. 6 shows the ecological operating mode selection system for ventilation and air conditioning, directly connecting to the electrically powered pneumatic compressor system.

Similarly in FIG. 6, selector 5 connects to the electrically powered pneumatic compressor system 4 in charge of supplying the correct amount of air in the ecological operating mode.

Figure 7:
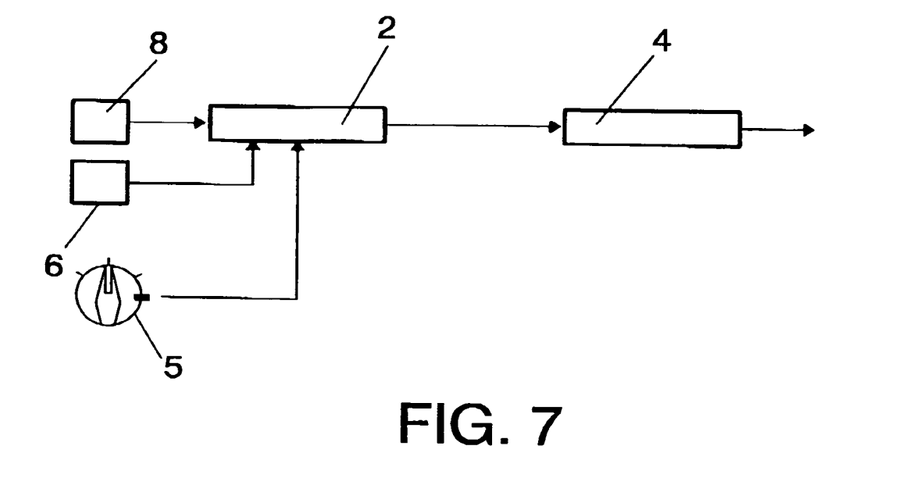
In FIG. 7 the ecological operating mode selection system for ventilation and air conditioning connects to the pneumatic air conditioning system and in FIG. 8 to a different controller.

In FIG. 7 selector 5 connects directly to system 2 which informs system 4 whether the ecological operating mode has been selected.

Figure 8:
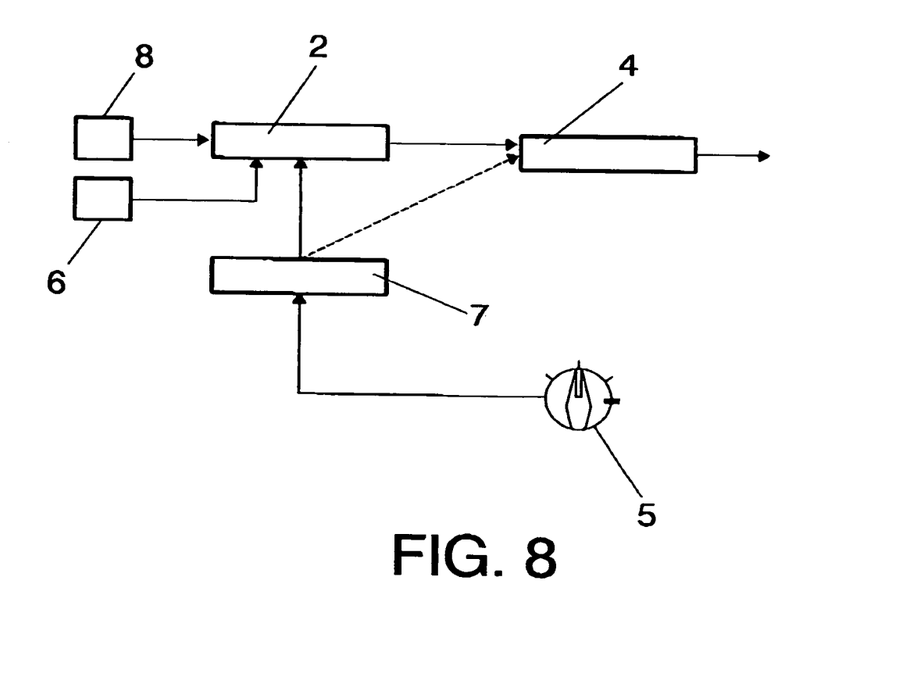

In FIG. 8 selector 5 connects directly to another controller 7 that either connects to system 2 or system 4.

Worth pointing out is that selector 5 may be incorporated in any part of the plane. For example it may be located in the cabin temperature selector 3, in the cockpit, in the temperature control panel for the cabin crew, in the onboard maintenance terminal, in the actual invention's control device, etc.

Figure 9:
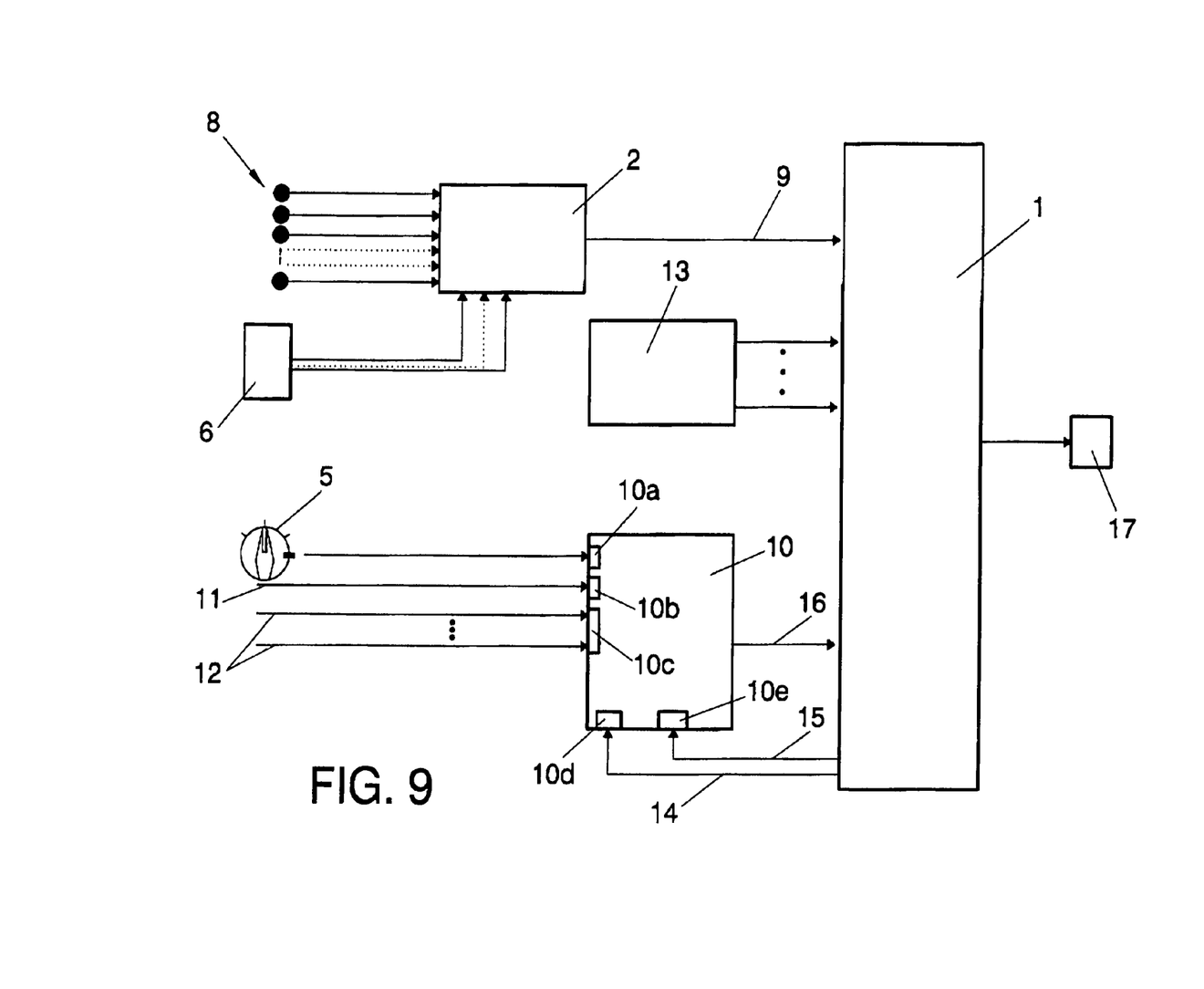
FIG. 9 is a diagram of functional blocks that relate to the invention's applications shown in FIGS. 3, 5, 6 and 8.

FIG. 9 shows an implementation example that is valid for FIGS. 3, 5, 6 and 8.

In accordance with the normal operations described previously, a pneumatic air conditioning system 2 is connected to different temperature measurement sensors 8 in the cabin 3, and a temperature selector 6 that may be used to select the desired temperature in the cabin 3. It generates a demand signal for a specific volume of air, depending on the inside temperature selected by selector 6 and the actual temperature measured by the sensors 8. The demand signal 9 will be lower the closer the two temperatures. It reaches a steady state condition when both temperatures are equal. This steady state condition can be anywhere between 0 and 100% based on the difference between the two temperatures, as described in the Background to the Invention section. Thus the system operates in normal mode as long as ecological mode is not selected by activating selector 5, in which case the intervention device starts to operate as described below.

To ensure the intervention device operates in ecological mode, selector 5 must be activated. This action is detected by means of a detector system 10. More specifically the ecological mode detection system 10*a* makes this detection.

In addition, for the ecological operations mode to be activated the plane must be stationed on the ground. A system that detects the position of the aircraft on the ground 10*b* is available for this purpose. It can detect a characteristic signal 11 that determines the plane is positioned on the ground, e.g. a signal from a sensor indicating the legs of the aircraft are bearing weight, clearly showing the aircraft is on the ground.

The engines of the plane must be turned off. The typical aircraft signals 12 that indicate the engine is turned off apply to detector 10, and more specifically to a system of detectors 10*c*.

Figure 10:
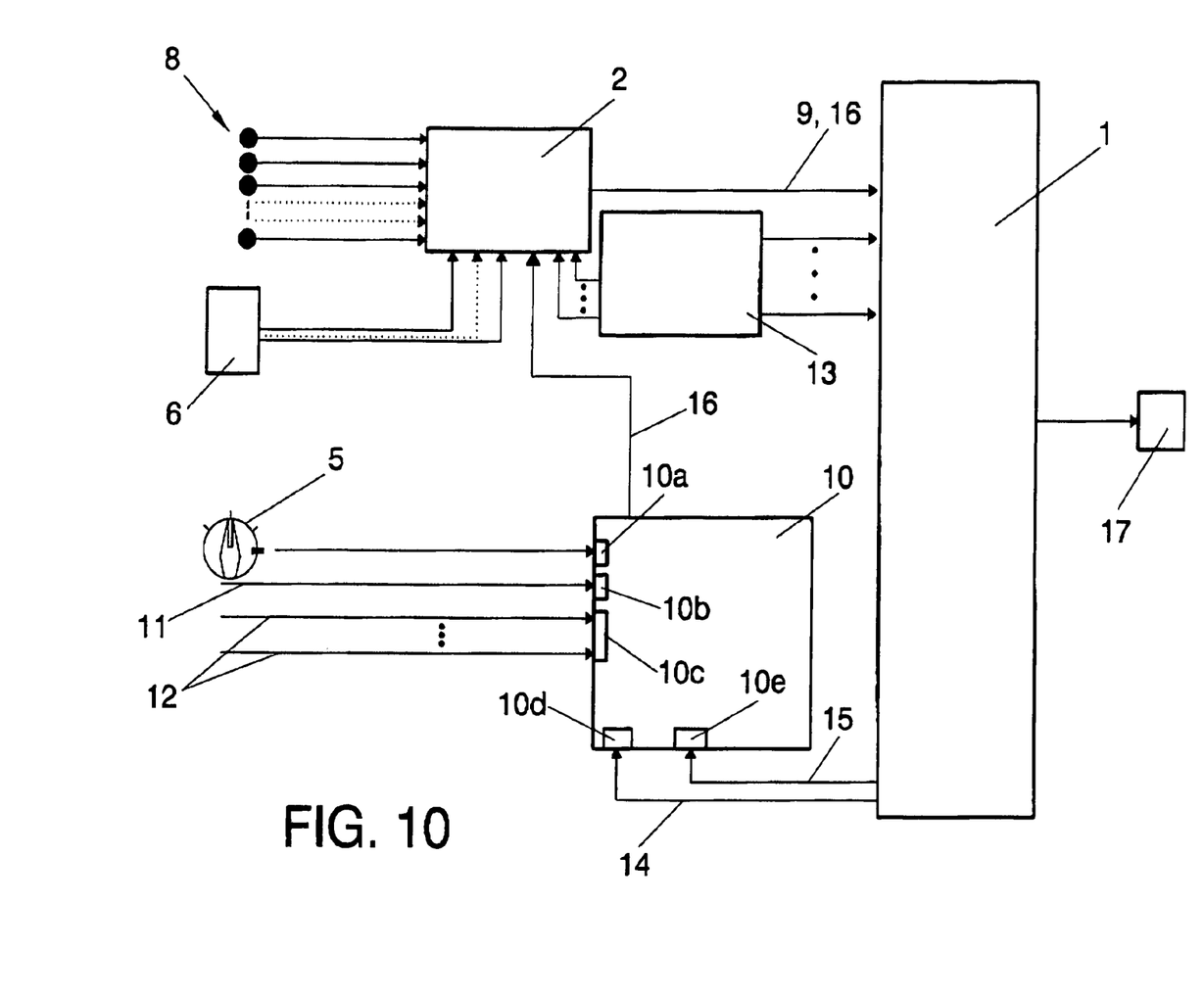
FIG. 10 is a diagram of functional blocks similar to the previous diagram. In this case the invention's applications refer to FIGS. 4 and 7.

In addition, to activate the ecological operating mode, the pneumatic APU 1, which appears in FIGS. 3, 5, 6 and 8, must be activated. In FIGS. 4, 7 and 10 the electrical APU must be activated. This is detected by means of a detection system 10*d* to which the APU 1, 1*a*, is connected via connection 14.

A test should always be carried out to detect whether air is being supplied.

To do so, APU 1 controller, 1*a*, connects to a detection system 10*e* via connection 15. The detection system detects whether APU 1, 1*a*, is supplying air.

When the aforementioned indicators are detected an ecological operating mode signal 16 is generated by the detection system 10 and sent to the controller in APU 1. In the case of FIG. 10 (valid for FIGS. 4 and 7) the signal is sent to the controller in the pneumatic air conditioning system 2.

The detection system 10 may be comprised of a filter such as a logical AND port that generates an ecological mode signal when all the aforementioned conditions are identified.

Once the ecological mode signal 16 is generated, the intervention device must verify that the engine's start-up system has not been activated 13. The engine start-up system is 13 connected to the APU controller 1. If the ecological mode signal is detected 16, and system 13 has not been activated, APU 1 enters ecological operation mode. It sends a signal to the inlet guide vane's 17 (IGV) normal actuator that opens or closes to the area that leads to the APU load compressor 1. Likewise it regulates the mass of air transferred to the pneumatic air conditioning system 2. The IGV is typically incorporated in the APU.

System 13 is comprised of an interface that is typically incorporated in the aircraft and generates signals relating to the engines start up system (MES; Main Engine Start)

If an ecological operating mode 16 signal is not generated, the signal sent to the IGV actuator 17 will depend on the normal demand signal 9 described above.

However if an ecological operating mode signal is generated 16, and the engine start-up system 13 has not been activated, and logically the engines have not started, the position of the IGV 17 will be regulated based on the percentage of the signal in ecological mode 16. This percentage may be established based on environmental parameters, such as outside ambient temperature, height, or a pre-established limit, in which case the APU 1 detects these temperatures or establishes the prior established limit.

For example, when the aircraft is stationary and an inside temperature of 23° is selected for the cabin 3, and the outside ambient temperature is 5°, system 2 may require the APU controller 1 to supply 60% pneumatic demand, given the considerable difference between the selected temperature 6 and the temperature measured 8.

On the contrary by selecting the ecological operating mode 0% of the normal operating mode demand is established (0% is the value defined for the ecological operating mode), and the demand signal 9 from system 2 is ignored.

As a result APU 1 supplies 0% equivalent demand according to the ecological mode regulations. Consequently the IGVs 17 adopt a position that corresponds to the ecological mode regulations for a temperature of 5°, instead of a 60% equivalent position, implying a saving in pneumatic power, a reduction in fuel consumption and a reduction in noise emitted by the APU, by virtue of a reduction in the action of the pneumatic air conditioning system 2.

The information provided above is similar for FIG. 10. In this case however the engine start up system 13, apart from being able to connect to the APU electrical controller 1b, can also connect to the pneumatic air conditioning system 2 controller. When the pneumatic air conditioning system receives the signal in ecological mode 16, it checks to see if the system has activated 13, generating signal 9 or 16 as described in the previous example. Thus the APU controller 1b controls the position of the IGVs 17 based on whether it receives signal 9 or 16, as described for FIG. 9.

The invention claimed is:

1. A DEVICE TO CONTROL VENTILATION AND AIR CONDITIONING IN AN AIRCRAFT ON THE GROUND, which must be connected (12) to an engines' start-up system, comprising a temperature selection system (6) in a cabin (3) of the aircraft, a temperature measurement system (8) in the cabin (3) of the aircraft, systems including a pneumatic air conditioning system (2), connected to a pneumatic energy supply system, an electrically powered pneumatic compressor system (4) connected to an electrical energy supply system and to a pneumatic air conditioning system (2); and a combination of the above, to control the ventilation and air conditioning of an aircraft based on the difference between a selected temperature (6) and a measured temperature (8), said device comprising a system of (5) ecological operating mode selection for ventilation and air conditioning, a system that detects whether or not an ecological mode has been selected (10,10a), a system to detect the position of the aircraft on the ground (10, 10b), a system to detect whether the aircraft's engines are off (10, 10c), a system to detect whether a selected energy supply system has been activated (10, 10d)—this may be either the pneumatic energy supply or electrical energy supply, a system to detect whether air is being supplied (10, 10e), a system to detect whether the engine's start up system has been activated (13), and a system that generates (10) an ecological operating mode signal (16), corresponding to an optimal minimum demand for ventilation and air conditioning, which is selectively applied to the pneumatic energy supply system, the electrically powered pneumatic compressor system and the electrical energy supply system, when ecological operating mode has been selected, the aircraft is detected to be on the ground, the engines are detected off and the engines' start up system has not been activated, the selected energy supply—either the pneumatic energy supply system or the electrical energy supply system is activated and supplying air, to control the ventilation and air conditioning in accordance with a minimum level established by the ecological operating mode signal (16) independent of a difference between the selected temperature (6) and the temperature measured (8), to save energy.

2. A DEVICE TO CONTROL VENTILATION AND AIR CONDITIONING OF AN AIRCRAFT ON THE GROUND, in accordance with claim 1, wherein the ecological operating mode (16) signal depends on at least one parameter.

3. A DEVICE TO CONTROL VENTILATION AND AIR CONDITIONING OF AN AIRCRAFT ON THE GROUND, in accordance with claim 2, wherein the parameter is: outside ambient temperature of the aircraft, outside pressure (barometric height), or a combination of the two.

4. A DEVICE TO CONTROL VENTILATION AND AIR CONDITIONING OF AN AIRCRAFT ON THE GROUND, in accordance with claim 1, wherein the ecological operation section relates to a pre-established fixed value.

5. A DEVICE TO CONTROL VENTILATION AND AIR CONDITIONING OF AN AIRCRAFT ON THE GROUND, in accordance with claim 1, wherein the pneumatic energy supply system represents a choice between an auxiliary power unit (1) in the aircraft and an electrically powered pneumatic compressor system (4).

6. A DEVICE TO CONTROL VENTILATION AND AIR CONDITIONING OF AN AIRCRAFT ON THE GROUND, in accordance with claim 1, wherein the electrical energy supply system is a choice between an auxiliary power unit (1a) in the aircraft and an electrical energy supply unit outside the aircraft.

7. A DEVICE TO CONTROL VENTILATION AND AIR CONDITIONING OF AN AIRCRAFT ON THE GROUND, in accordance with claim 1, wherein the ecological operating mode selection system for ventilation and air conditioning, a system to detect the position of the aircraft on the ground, a system to detect whether the aircraft's engines are off, a system to detect whether the engine's start-up system has been activated, a system to detect whether the selected energy supply system—namely, the pneumatic energy supply or the electrical energy supply—has been activated, a system to detect whether air is being supplied, and a system that generates an ecological operating mode signal, are included in the pneumatic air conditioning system, the pneumatic energy supply system, the electrically powered pneumatic compressor system, in the electrical energy supply system; or in any combination of these.

8. A DEVICE TO CONTROL VENTILATION AND AIR CONDITIONING OF AN AIRCRAFT ON THE GROUND, in accordance with claim 7, wherein the ecological operating mode selection system is comprised of a selector that connects to said ecological operating mode signal generation system selectively by means of cables, an Ethernet, or a combination of the two; and is included selectively in the ecological operating mode signal generation system.

9. A DEVICE TO CONTROL VENTILATION AND AIR CONDITIONING OF AN AIRCRAFT ON THE GROUND, in accordance with claim 1, wherein the inside temperature of the aircraft is selected from an overall temperature or a temperature of a specific section of the aircraft.

10. A DEVICE TO CONTROL VENTILATION AND AIR CONDITIONING OF AN AIRCRAFT ON THE GROUND, in accordance with claim 2, wherein the ecological operating mode selection system for ventilation and air conditioning, a system to detect the position of the aircraft on the ground, a system to detect whether the aircraft's engines are off, a system to detect whether the engine's start-up system has been activated, a system to detect whether the selected energy supply system—namely, the pneumatic energy supply or the electrical energy supply—has been activated, a system to detect whether air is being supplied, and a system that generates an ecological operating mode signal, are included in the pneumatic air conditioning system, the pneumatic energy supply system, the electrically powered pneumatic compressor system, in the electrical energy supply system; or in any combination of these.

11. A DEVICE TO CONTROL VENTILATION AND AIR CONDITIONING OF AN AIRCRAFT ON THE GROUND, in accordance with claim 3, wherein the ecological operating mode selection system for ventilation and air conditioning, a system to detect the position of the aircraft on the ground, a system to detect whether the aircraft's engines are off, a system to detect whether the engine's start-up system has been activated, a system to detect whether the selected energy supply system—namely, the pneumatic energy supply or the electrical energy supply—has been activated, a system to detect whether air is being supplied, and a system that generates an ecological operating mode signal, are included in the pneumatic air conditioning system, the pneumatic energy supply system, the electrically powered pneumatic compressor system, in the electrical energy supply system; or in any combination of these.

12. A DEVICE TO CONTROL VENTILATION AND AIR CONDITIONING OF AN AIRCRAFT ON THE GROUND, in accordance with claim 4, wherein the ecological operating mode selection system for ventilation and air conditioning, a system to detect the position of the aircraft on the ground, a system to detect whether the aircraft's engines are off, a system to detect whether the engine's start-up system has been activated, a system to detect whether the selected energy supply system—namely, the pneumatic energy supply or the electrical energy supply—has been activated, a system to detect whether air is being supplied, and a system that generates an ecological operating mode signal, are included in the pneumatic air conditioning system, the pneumatic energy supply system, the electrically powered pneumatic compressor system, in the electrical energy supply system; or in any combination of these.

13. A DEVICE TO CONTROL VENTILATION AND AIR CONDITIONING OF AN AIRCRAFT ON THE GROUND, in accordance with claim 5, wherein the ecological operating mode selection system for ventilation and air conditioning, a system to detect the position of the aircraft on the ground, a system to detect whether the aircraft's engines are off, a system to detect whether the engine's start-up system has been activated, a system to detect whether the selected energy supply system—namely, the pneumatic energy supply or the electrical energy supply—has been activated, a system to detect whether air is being supplied, and a system that generates an ecological operating mode signal, are included in the pneumatic air conditioning system, the pneumatic energy supply system, the electrically powered pneumatic compressor system, in the electrical energy supply system; or in any combination of these.

14. A DEVICE TO CONTROL VENTILATION AND AIR CONDITIONING OF AN AIRCRAFT ON THE GROUND, in accordance with claim 6, wherein the ecological operating mode selection system for ventilation and air conditioning, a system to detect the position of the aircraft on the ground, a system to detect whether the aircraft's engines are off, a system to detect whether the engine's start-up system has been activated, a system to detect whether the selected energy supply system—namely, the pneumatic energy supply or the electrical energy supply—has been activated, a system to detect whether air is being supplied, and a system that generates an ecological operating mode signal, are included in the pneumatic air conditioning system, the pneumatic energy supply system, the electrically powered pneumatic compressor system, in the electrical energy supply system; or in any combination of these.

* * * * *